US 6,637,795 B2

(12) United States Patent
Jonardi et al.

(10) Patent No.: US 6,637,795 B2
(45) Date of Patent: Oct. 28, 2003

(54) COMBINATION OF A VEHICLE DOOR AND A STORAGE BOX

(75) Inventors: William A. Jonardi, Clinton Township, MI (US); Volker Kohl, Horb-Altheim (DE); Karl-Heinz Schuller, Aidlingen (DE); Jürgen P. Steupert, Detroit, MI (US); Arnd K. H. Überhorst, Sprockhövel (DE)

(73) Assignees: DaimlerChrysler AG, Stuttgart (DE); Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/045,183

(22) Filed: Oct. 18, 2001

(65) Prior Publication Data

US 2002/0185888 A1 Dec. 12, 2002

(30) Foreign Application Priority Data

Oct. 21, 2000 (DE) .......................................... 100 52 230

(51) Int. Cl.$^7$ ................................................ B60R 7/04
(52) U.S. Cl. .................... 296/37.13; 296/152; 224/543; 224/544
(58) Field of Search ............................... 296/152, 37.8, 296/37.9, 37.13; 224/539, 543, 544; 70/58, 63, 69, 70

(56) References Cited

U.S. PATENT DOCUMENTS

| 2,504,515 | A | * | 4/1950 | Gantner et al. ............. 224/277 |
| 3,083,896 | A | * | 4/1963 | Cairelli et al. ................ 70/63 |
| 3,116,849 | A | * | 1/1964 | Brewer et al. ................. 70/63 |
| 4,756,457 | A |   | 7/1988 | Polk ........................... 224/509 |
| 6,196,605 | B1 | * | 3/2001 | Baldas et al. ............ 296/37.13 |

FOREIGN PATENT DOCUMENTS

| DE | 84 29 816 | 1/1986 |
| DE | 295 00 669 | 7/1996 |

* cited by examiner

Primary Examiner—D. Glenn Dayoan
Assistant Examiner—Lori L Coletta
(74) Attorney, Agent, or Firm—Kenyon & Kenyon

(57) ABSTRACT

In a combination of a motor-vehicle door, in particular, that of a passenger car or commercial vehicle, and a storage box that is used to accommodate utensils, objects, etc., the storage box has a shell, which includes a lower segment and an upper segment. The vehicle door includes an interior trim panel, which has a storage compartment open at the top. The inner contour of the storage compartment is shaped to be complementary to the outer contour of the lower shell segment, so that the lower shell segment may be vertically inserted into the storage compartment, the upper shell segment then projecting upwards from the storage compartment, and laterally resting against an essentially vertical panel of the interior trim panel.

17 Claims, 1 Drawing Sheet

COMBINATION OF A VEHICLE DOOR AND A STORAGE BOX

FIELD OF THE INVENTION

The present invention relates to a combination of a motor-vehicle door, in particular, that of a passenger car or commercial vehicle, and a storage box that is used to accommodate utensils, objects, etc.

BACKGROUND INFORMATION

German Published Patent Application No. 295 00 669 U describes a storage box which can be attached to the exterior of a motor vehicle, preferably to the rear end. The storage box is used to store first-aid equipment, and, because it is attached to the outside of the vehicle, it can immediately be seen by each road user and is thereby situated at an optimally accessible position. The intention here is to increase the overall traffic safety of the vehicle.

U.S. Pat. No. 4,756,457 describes another storage box, which is attached to the rear end of a vehicle. This storage box extends across the entire width of the vehicle, and is made of two halves, which can be swung outwards to open the storage box. This storage box increases the storage space of the vehicle.

German Published Patent Application No. 84 29 816 U describes a first-aid kit, which can be attached to an interior trim panel in the passenger compartment. Snap-on projections are provided for this purpose, which extend into the vehicle interior, and have detents, which are directed towards each other and laterally engage with the snap-on projections to secure the first-aid kit.

SUMMARY

One object of the present invention is to improve the accessibility of a storage box in a motor-vehicle.

The present invention, according to one example embodiment thereof, provides a storage box that is integrated into an interior trim panel of a vehicle door, the interior trim panel having a storage compartment that is shaped to be complementary to the storage box, and the storage box being insertable into and removable from the storage compartment, in the form of a plug-and-socket connection. This allows the storage box to always be within reach of the driver or a passenger, so that the storage box may quickly be removed from its storage compartment, and its contents are available. These advantages may be of particular importance, when the storage box is designed to accommodate first-aid equipment. At the location of an accident, the driver or a passenger may then make the first-aid equipment available without delay or use it to administer first aid.

In accordance with an example embodiment of the present invention, an upper shell segment of the storage box may have, in a boundary segment adjacent to a lower shell segment, at least one region, which, in relation to the lower shell segment, protrudes in a direction perpendicular to the insertion direction, and rests on an opening edge of the storage compartment. This measure determines the depth to which the storage box may be inserted into the storage compartment, and may ensure that the inserted storage box always occupies a predetermined position relative to the interior trim panel. Thus, it may be ensured that the storage box is optically integrated into the interior trim.

This protruding region may be dimensioned so that it is flush with the opening edge. This allows the support to be designed to be particularly sturdy, while the integration of the outer contour of the storage box into the inner trim panel is simultaneously improved.

A handle may be formed in the upper shell segment, in order to improve the insertion and removal of the storage box.

In accordance with one example embodiment of the present invention, a locking arrangement is provided. In this example embodiment, first locking parts may be formed on the storage compartment, which interact with second locking parts formed on the lower shell segment. This locking arrangement may secure the storage box in the storage compartment, whereby the crash safety of the combination of the storage box and vehicle door is improved.

In another example embodiment, the storage box may be designed as a reinforcing member, which reinforces the vehicle door when the reinforcing member is inserted into the storage compartment. In the case of this example embodiment, the storage box is functionally integrated into the structure of the vehicle door. The stiffness of the storage box, which, for example, may be attained by a correspondingly rigid shell, may be used to improve or supplement the stiffness of the vehicle doors.

According to another example embodiment of the present invention, the back of the storage box, which rests against a panel of the interior trim when the storage box is inserted into the storage compartment, may be designed to be open, and thus, to allow free access to the contents of the storage box, when the storage box is removed from the storage compartment. This feature further improves the accessibility of the storage-box contents.

Additional significant features and advantages of the device according to the present invention are described below.

It should be understood that the above-mentioned features and the features still to be explained below may not only be used in each specified combination, but also in other combinations or alone, without abandoning the framework of the present invention.

An exemplary embodiment of the present invention is represented in the drawings and explained in detail in the following description.

DETAILED DESCRIPTION

Figure 1:
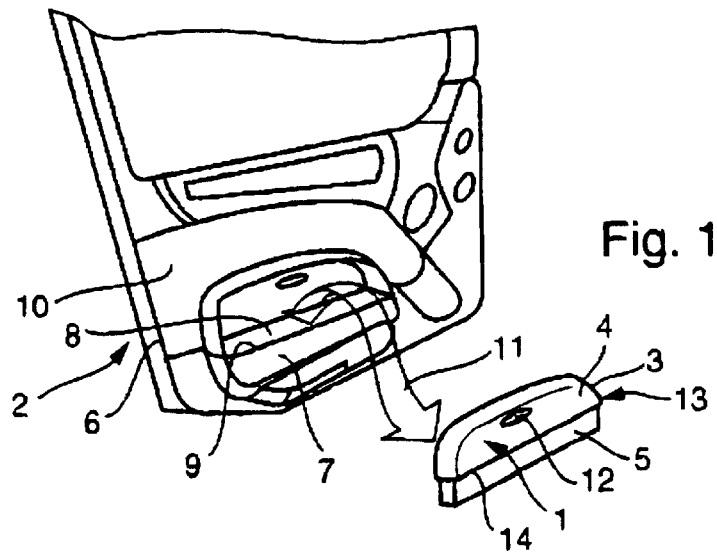
FIG. 1 is a schematic perspective view of the inside of a vehicle door, which has a storage box that is attached or may be attached to it.

In accordance with FIG. 1, a combination of the present invention is formed from a storage box 1 and a door 2 of a motor vehicle, e.g. of a passenger car or commercial vehicle. For this purpose, storage box 1 has a shell 3, which includes an upper shell segment 4 and a lower shell segment 5. In addition, vehicle door 2 possesses an interior trim panel 6, which has, in a lower segment, a storage compartment 7 that is open from above, an opening 8 of the storage compartment being surrounded by an opening edge 9. In order to produce the combination, the outer contour of lower shell segment 5 is designed to be complementary to the inner contour of storage compartment 7. Accordingly, lower shell segment 5 of storage box 1 may be inserted into storage compartment 7. In so doing, the back of storage box 1, at least its upper shell segment 4, comes to rest against an essentially vertical panel 10, which is formed above storage compartment 7, on interior trim panel 6.

The insertion movement and the corresponding removal movement are indicated in FIG. 1 by double arrow 11.

In order to improve the representation, storage box 1 is illustrated in two states in FIG. 1. In the one state, storage box 1 is removed from its storage compartment 7 and separated from vehicle door 2 (this representation of storage box 1 is provided with the reference numerals). In the other state, storage box 1 is inserted in its storage compartment 7.

Upper shell segment 4 is provided with a handle 12, which improves the handling of storage box 1.

Upper shell segment 4 and lower shell segment 5 border on each other in a border segment 13, in which upper shell segment 4 has a region 14 that, in relation to lower shell segment 5, juts out perpendicularly to the insertion direction. When storage box 1 is inserted in storage compartment 7, this region 14 rests on opening edge 9 of storage compartment 7. In the example embodiment illustrated, region 14 is formed around the entire periphery, except on the back of storage box 1. The dimensions of region 14 are selected such that region 14 terminates flush with opening edge 9, when storage box 1 is inserted in its storage compartment 7. In this manner, storage box 1 is integrated into interior trim panel 6 of door 2 in an aesthetically advantageous manner.

An example embodiment of the present invention provides for shell 3 of storage box 1 to be constructed out of especially strong and rigid elements, so that storage box 1 as such is designed to be dimensionally stable, and may be used as a reinforcing member for vehicle door 2. To this end, storage compartment 7 is adapted in a suitable manner, and allows forces acting on door 2 to be transmitted to storage box 1. In the case in which storage box 1 is inserted into storage compartment 7, this example embodiment provides vehicle door 2 with considerable, additional reinforcement.

Figure 2:
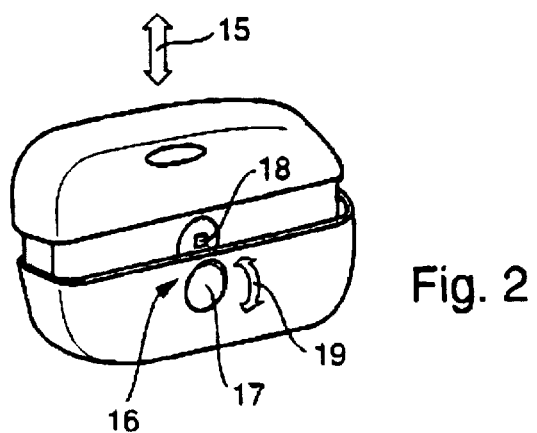
FIG. 2 is a schematic perspective view of a detail of FIG. 1, but in this case, when the storage box is inserted into or removed from a corresponding storage compartment of the vehicle door.

The insertion and the removal of storage box 1 from its storage compartment 7 are also illustrated in FIG. 2, a double arrow 15 indicating the direction of the insertion movement and of the movement during the removal of storage box 1. According to FIG. 2, a locking arrangement 16 having first locking parts 17 and second locking parts 18 may be provided, the latter two interacting with each other to lock storage box 1 in its storage compartment 7. In this context, first locking parts 17 are formed on storage compartment 7, while second locking parts 18 are formed on lower shell segment 5. First locking parts 17 may take the form of a twist lock, which, when rotated according to a double arrow 19, releases or blocks second locking part 18, which, in turn, may take the form of a locking bolt.

Locking arrangement 16 may ensure that storage box 1 remains secured in such a position relative to vehicle door 2 that storage box 1 may, for example, fulfill its reinforcement function. In addition, the securing increases the crash safety of storage box 1.

Figure 3:
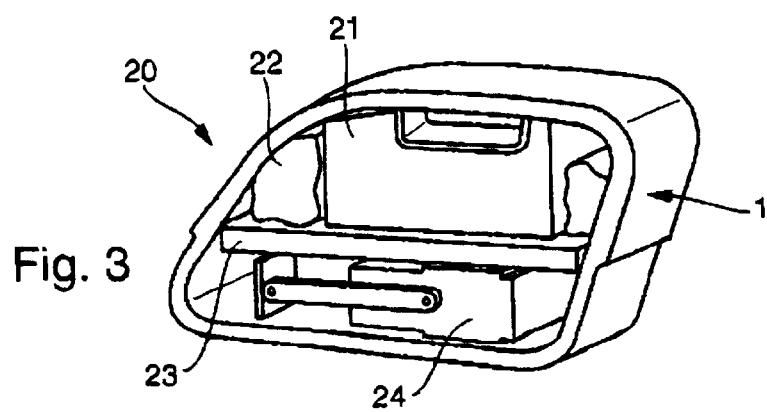
FIG. 3 is a schematic perspective view of the back of the storage box.

In an example embodiment illustrated in FIG. 3, the back of storage box 1 is open, and therefore, formed without a lock, trap, lid, or the like, so that the contents of storage box 1 are immediately accessible upon removing storage box 1 from storage compartment 7. This example embodiment may be provided when storage box 1 is designed to accommodate emergency equipment or first-aid equipment 20, as is the case here. For example, this equipment 20 may include a first-aid kit 21, a first-aid blanket 22, an emergency reflective triangle 23, a warning light 24, etc.

In another example embodiment of the present invention, storage box 1 may be in the form of, e.g. a tool box. In this example embodiment, it is less important to provide quick access to the storage box as compared to when the storage box 1 is arranged to store first aid or safety equipment. However, the storage box may accommodate any desired articles, utensils, etc.

What is claimed is:

1. An apparatus, comprising:

a door of a motor vehicle, the door having an interior trim panel which includes a storage compartment open from above, the storage compartment having an inner contour; and an storage box having a shell which includes a lower shell segment and an upper shell segment rigid with respect to the lower shell segment, the inner contour of the storage compartment shaped to be complementary to an outer contour of the lower shell segment such that the lower shell segment is vertically insertable into the storage compartment, the upper shell segment projecting upwardly from a top of the storage compartment and laterally resting against an essentially vertical panel of the interior trim panel.

2. The apparatus of claim 1, wherein, in a border segment adjacent to the lower shell segment, the upper shell segment has at least one region that, relative to the lower shell segment, protrudes substantially perpendicularly relative to an insertion direction, and rests on an opening edge of the storage compartment.

3. The apparatus of claim 2, wherein the protruding region is dimensioned to be flush with the opening edge of the storage compartment.

4. The apparatus of claim 2, wherein the protruding region is formed on and extends around the shell up to a segment resting against the vertical panel of the interior trim panel.

5. The apparatus of claim 1, wherein a handle is formed in the upper shell segment.

6. The apparatus of claim 1, further comprising a locking arrangement including:

first locking parts formed on the storage compartment; and second locking parts formed on the lower shell segment, the first locking parts configured to interact with the second locking parts.

7. The apparatus of claim 1, wherein the storage box is arranged as a reinforcing member configured to reinforce the vehicle door when the storage box is inserted into the storage compartment.

8. The apparatus of claim 1, wherein the storage box includes a back which rests against the vertical panel of the interior trim panel when the storage box is inserted, and wherein the back is open such that the contents of the storage box are accessible upon removal of the storage box from the storage compartment.

9. The apparatus of claim 1, wherein the storage box is arranged to accommodate at least one of emergency equipment and first-aid equipment.

10. The apparatus of claim 1, wherein the motor vehicle includes one of a passenger car and a commercial vehicle.

11. The apparatus of claim 1, wherein the storage box is configured to occupy a predetermined position relative to the storage compartment in an inserted position of the storage box into the storage compartment.

12. The apparatus of claim 1, wherein the storage box is optically integrated into the interior trim panel.

13. The apparatus of claim 6, wherein the first locking parts are configured as a twist lock and the second locking parts are configured as a locking bolt.

14. The apparatus of claim 6, wherein the first locking parts and the second locking parts are configured to increase a crash safety of the motor vehicle.

15. The apparatus of claim 9, wherein the at least one of emergency and first-aid equipment includes at least one of a first-aid kit, a first-aid blanket, an emergency reflective triangle, and a warning light.

16. The apparatus of claim 1, wherein the storage box is configured as a tool box.

17. The apparatus of claim 1, wherein the storage box is arranged to accommodate at least one of an article and a utensil.

* * * * *